Dec. 2, 1969   E. S. BUNN   3,481,024
METHOD OF BONDING
Filed June 16, 1967
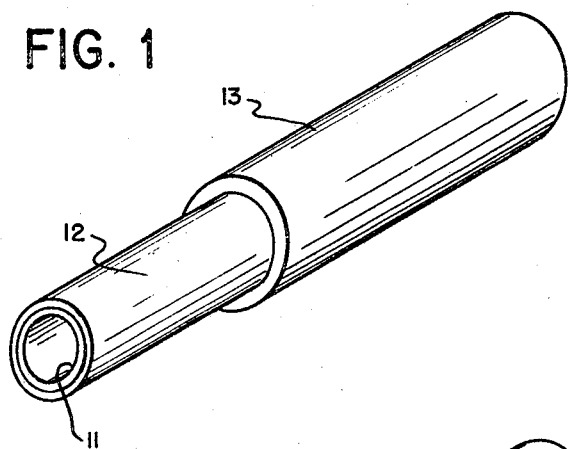
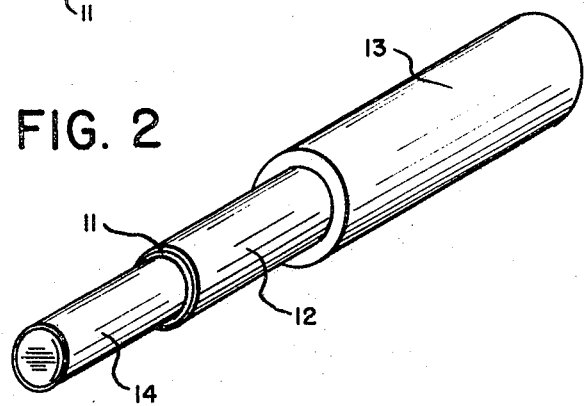
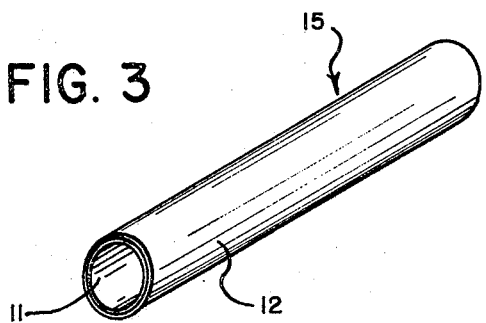
INVENTOR
Edward Schaible Bunn
BY
ATTORNEYS United States Patent Office 3,481,024
Patented Dec. 2, 1969

3,481,024
METHOD OF BONDING
Edward Schaible Bunn, Rome, N.Y., assignor to Revere Copper and Brass Incorporated, Rome, N.Y., a corporation of Maryland
Filed June 16, 1967, Ser. No. 646,526
Int. Cl. B23k 31/02
U.S. Cl. 29—473.5                                      7 Claims

ABSTRACT OF THE DISCLOSURE

Composite metal tubing formed of dissimilar metals metallurgically bonded together is produced by positioning the inner tubular components concentrically within the outer tubular component followed by placing the thus assembled components within an outer metal tube having an appreciably lower coefficient of thermal expansion than that of any of the tubular components of the tubing. The assembly of tubular components and outer restraining tube are mechanically worked and then are heated at a temperature of between 750° and 950° F. for at least one hour to cause the tubular components first to expand and then to move longitudinally with respect to each other and then to become metallurgically bonded together. The outer restraining tube is then removed from the metallurgically bonded components of the composite tubing.

BACKGROUND OF THE INVENTION

Composite metal tubing formed of dissimilar metals that are metallurgically bonded together are widely used when it is desired to take advantage of certain phyiscal and other properties of one (or both) of the components of the composite tubing not possessed by the other. For example, composite metal tubing formed of a stainless steel tube clad with an aluminum tube, or aluminum tubing clad with stainless steel, is used when it is desired to take advantage of the excellent thermal conductivity of aluminum and the corrosion resistance of stainless steel. Such tubing is employed in the food processing industry and in the manufacture of heat exchange equipment where one of the fluids is corrosive in nature. Such composite tubing can also be employed as a transition or coupling member between a section of stainless steel pipe and an adjacent section of aluminum pipe.

The bond between the layer of stainless steel and the layer of aluminum which make up the composite metal tube must be sufficiently strong to withstand the stresses and strains of fabrication and use, and therefore a metallurgical bond—that is, one formed by the diffusion of one metal into the other—should be established in the interface of the layers of metal that make up the composite tube. However, the surfaces of both the stainless steel and aluminum are normally completely covered with a protective film of metal oxide, and although these oxide films are microscopically thin they prevent the metal-to-metal contact necessary for the formation of the desired metallurgical bond. As a consequence, in order to obtain a metallurgical bond between the stainless steel and aluminum components of the composite metal tubing, it has heretofore been the practice to remove by physical or chemical means the protective oxide film from the facing surfaces of the metal tubes to be bonded together so that the so-called nascent or raw elemental metal at these surfaces can be brought directly into contact with each other without an intervening physical barrier of aluminum (or other) oxide therebetween. As the oxide film on aluminum almost instantaneously re-forms when a fresh surface of elemental aluminum is exposed to air it has heretofore been necessary to remove the oxide films and bring the thus exposed metal surfaces together while the aluminum and stainless steel tubing are in a protective environment, such as a reducing or inert atmosphere. The desired metallurgical bond is then formed by subjecting the tubing to a combination of heat and pressure in a manner well known in the art. However, the requirement that the surfaces of the metal tubing be oxide-free prior to and during the formation of the metallurgical bond necessitates the use of complex and costly techniques and equipment, and this has been an important disadvantage of conventional processes for bonding aluminum to stainless steel tubing.

SUMMARY OF THE INVENTION

I have now made the surprisng discovery that a metallurigical bond can be formed between stainless steel and aluminum tubing without first removing the oxide film from the facing surfaces of either metal. In the novel method of my invention the tubular components of composite metal tubing are advantageously thoroughly cleaned and then are positioned concentrically one within the other. The thus assembled tubular components are then placed within an outer restraining tube that fits closely about the outer tubular component of the basic assembly of tubular components. The outer restraining tube is formed from a metal, such as carbon steel, that has an appreciably lower coefficient of thermal expansion than that of any of the tubular components of said assembly and that has sufficient tensile strength to resist appreciable plastic deformation at the temperature to which the assembly of tubes is to be heated. The basic assembly of tubular components and the outer restraining tube are mechanically worked to reduce the wall thickness thereof and thereby insure intimate physical contact between the mutually facing surfaces of the tubular components. In the preferred practice of my invention the assembly of tubular components and outer restraining tube are placed on a closely fitting plug or mandrel, and the basic assembly of tubular components, restraining tube and plug or mandrel are then subjected to a drawing operation to effect reduction of between about 25% and 30% in the wall thickness of the tubular components of the composite tubing. The mechanically worked assembly of tubular components and restraining tube is then heated at a temperature of between about 750° and 950° F. in an inert atmosphere whereby the tubular components of the composite tubing are caused to expand and, as a result of the differences in the coefficients of thermal expansion of the tubular components and the restraining tube, to move longitudinally with respect to each other. The relative longitudinal movement of the aluminum and stainless steel tubing causes the oxide film on the facing surfaces of the tubing to be abraded and attenuated thereby exposing areas of nascent metal at the interface of the aluminum and stainless steel tubing. Continued heating of the tubular components for at least one hour, and preferably for about two hours, results in the formation of a metallurgical bond at the interface of the aluminum and stainless steel. On completion of the heating operation the tubular assembly is cooled to the ambient temperature and the outer restraining tube is removed from the metallugically bonded components of the composite tubing. The mandrel, if any, is also removed from the tubing at this time.

BRIEF DESCRIPTION OF THE DRAWING

My new process for producing metallurgically bonded composite tubing will be better understood from the following description in conjunction with the accompanying drawing of which:

FIG. 1 is a perspective view of the dissimilar metal components of the composite tubing assembled together and partially inserted in the outer restraining tube;

FIG. 2 is a perspective view similar to FIG. 1 showing the tubular components partially inserted in an outer restraining tube and with a cylindrical mandrel partially inserted in the innermost of the tubular components of the composite tubing; and FIG. 3 is a perspective view of the metallurgically bonded tubing produced in accordance with the practice of my invention.

DESCRIPTION OF THE PREFERRED EMBODIMENT

The practice of my invention will be described in connection with the production of a composite metal tubing formed of an inner tubular component of stainless steel clad with an outer tubular component of aluminum. However, it will be understood that my new process for producing composite tubing of dissimilar metals is equally applicable to the production of tubing comprising an inner tubular component of aluminum clad with an outer tubular component of stainless steel, to composite tubing formed of metals other than stainless steel and aluminum, and to composite tubing comprising more than two tubular components or layers of dissimilar metal tubing. In all cases, however, it is essential that adjoining tubular components of the composite metal tubing be formed of metals that are capable of being metallurgicaly bonded together and that have significantly different coefficients of thermal expansion. When such dissimilar tubular components are confined, worked and heated in accordance with the practice of my invention these components will expand and hence move longitudinally with respect to each other at slightly different rates. As a result of such relative movement, and as a result of the continued heating of the thus longitudinally expanded tubes, the tubular components of the composite assembly become metallurgically bonded together as herein described.

Composite stainless steel and aluminum tubing is produced pursuant to my invention by first placing an inner tubular component 11 of stainless steel concentrically within an outer tubular component 12 of aluminum as shown in FIG. 1. The tubular components, of course, must fit snugly together, and the facing surfaces of the tubes are advantageously thoroughly cleaned and degreased before being placed together. As previously noted, the tubular components must have significantly different coefficients of thermal expansion, the coefficient of thermal expansion of stainless steel being about $21 \times 10^{-6}$ and the coefficient of thermal expansion of aluminum being about $31 \times 10^{-6}$.

The assembly of tubular components 11 and 12 is then placed within an outer restraining tube 13 that fits closely about the outer tubular component 12 of the assembly. The outer restraining tube 13 is formed of a material that has an appreciably lower coefficient of thermal expansion than either of the tubular components 11 or 12 and that has sufficient tensile strength to resist without appreciable plastic deformation the radial forces to which the tube 13 is subjected during the heating step of my process. Accordingly, the outer restraining tube 13 is advantageously formed of ordinary mild carbon steel which has a coefficient of thermal expansion of about $16 \times 10^{-6}$ and has ample tensile strength to resist plastic deformation at the temperature to which the assembly of tubular components and restraining tube are to be heated. A parting agent may advantageously be employed to prevent the formation of a metallurgical bond between the outer tubular component 12 of the composite and the restraining tube 13, this agent being applied to the facing surfaces of these tubes prior to assembly thereof.

The assembly of tubular components 11 and 12 and outer restraining tube 13 are cold worked by drawing or rolling or the like to reduce the wall thickness of the several tubes of the assembly and thereby insure intimate physical contact between the facing surfaces of adjoining components of the assembly. In the preferred practice of my invention a steel plug or mandrel 14 is inserted into the inner tubular component 11 of the assembly as shown in FIG. 2, the plug or mandrel fitting snugly within the inner tube 11. If a mandrel is employed, it is advantageously coated with a parting agent to prevent the formation of a metallurgical bond between the mandrel 14 and the inner tubular component 11 in the subsequent steps of the process. If a plug is employed the contacting surfaces of the plug 14 and inner tubular component 11 may be lubricated with a conventional lubricant. The complete assembly of plug or mandrel 14, inner and other tubular components 11 and 12 and outer restraining tube 13 is then subjected to a conventional drawing operation to effect a substantial reduction in the overall wall thickness of the tubes 11, 12 and 13, the said reduction advantageously being in the order of from 25% to 30%.

The mechanically worked assembly of inner and outer tubular components 11 and 12 and the outer restraining tube 13 are then heated in an inert atmosphere (e.g., a nitrogen or non-oxidizing atmosphere) to a temperature of between about 750° and 950° F., and perferably at a temperature of about 850° F., for a period of at least one hour and preferably for a period of about two hours. When heated, the aluminum and stainless steel tubular components 11 and 12 thermally expand. However, radial expansion of these tubular components is restricted by the mild steel restraining tube 13 and as a result the tubular components expand in a longitudinal direction. The higher coefficient of thermal expansion of aluminum causes the tubular component formed of this metal to move or expand longitudinally a slightly greater distance than the tubular component formed of stainless steel, and this difference in longitudinal movement causes the oxide films at the interface of the two tubular components to become attenuated and then abraded or scraped away. The abrasion and partial scraping away of the oxide films at the interface of the tubular components 11 and 12 exposes small areas of nascent or raw elemental aluminum and stainless steel. Thermal expansion of the tubular components ceases, of course, when the components reach the maximum heat treatment temperature. However, continued heating at this high heat treatment temperature causes an intermetallic or metallurgical bond to be formed at the interface of the two tubular components where the raw or nascent aluminum and stainless steel are exposed.

On completion of the heat treatment, the assembly is cooled to the ambient temperature, and the outer restraining tube 13 is stripped from the metallurgically bonded tubular components 11 and 12. The resulting composite metal tubing 15, shown in FIG. 3, comprises an outer layer on tube of stainless steel metallurgically bonded to an inner layer or tube of aluminum.

The following example is illustrative but not limitative of the practice of my invention.

An aluminum tube having an inside diameter of one inch and a wall thickness of 0.125 inch is cleaned and degreased and then is fitted over a clean stainless steel tube having an outside diameter of 0.95 inch and a wall thickness of 0.10 inch. The two tubes are then placed within a mild steel restraining tube having an inside diameter of 1.20 inches and a wall thickness of 0.25 inch. The assembly of inner and outer tubular components of stainless steel and aluminum and the outer restraining tube of mild steel are then drawn over a plug to effect an overall reduction in the wall thickness of 25%. The thus worked assembly is heated to a temperature of 850° F. and is held at this temperature in an inert atmosphere for a period of two hours. The assembly is then cooled to ambient temperature and the mild steel restraining tube is stripped from the metallurgically bonded composite tubing of stainless steel and aluminum.

I claim:
1. Method of producing composite metal tubing the tubular components of which are formed of dissimilar metals metallurgically bonded together which comprises:
   positioning the inner tubular components concentrically within the outer tubular component of said composite tubing, positioning the thus assembled tubular components within an outer restraining tube that fits closely about the outer tubular component of said assembly, said outer restraining tube being formed from a metal that has an appreciably lower coefficient of thermal expansion than that of any of the said tubular components and that has sufficient tensile strength to resist appreciable plastic deformation at the temperature at which the assembly of tubular componets is to be heated, mechanically working the assembly of tubular components and outer restraining tube to reduce the wall thickness thereof and thereby insure intimate physical contact between the mutually facing surfaces of said tubular components, heating said assembly at a temperature of between about 750° and 950° F. for at least one hour in an inert atmosphere to cause the tubular components of the composite tubing to expand and thereby to move longitudinally with respect to each other whereby areas of nascent metal are exposed at the mutually facing surfaces of said tubular components and then to cause said tubular components to become metallurgically bonded together, and removing the outer restraining tube from the metallurgically bonded components of the composite tubing.

2. Method according to claim 1 in which the facing surfaces of the tubular components of the composite tubing are cleaned just prior to assembly.

3. Method according to claim 1 in which the composite tubing comprises two tubular components one of which is formed of aluminum and the other of which is formed of stainless steel.

4. Method according to claim 1 in which the outer restraining tube is formed of carbon steel.

5. Method according to claim 1 in which a closely fitting mandrel is positioned within the assembly of tubular components and outer restraining tube and in which said assembly and restraining tube are subjected to a drawing operation to effect reduction of between about 25% and 30% in the wall thickness of said tubular components.

6. Method according to claim 1 in which the assembly of tubular components is heated at a temperature of about 850° F.

7. Method according to claim 1 in which the assembly of tubular components and outer restraining tube are heated at said elevated temperature for about two hours.

References Cited

UNITED STATES PATENTS

| 1,078,906 | 11/1913 | Eldred | 29—473.5 |
| 2,769,231 | 11/1956 | Grenell | 29—474.3 X |
| 2,947,078 | 8/1960 | Pflumm et al. | 29—474.3 |

JOHN F. CAMPBELL, Primary Examiner

J. L. CLINE, Assistant Examiner

U.S. Cl. X.R.

29—474.3